US010653168B2

(12) United States Patent
Friesen et al.

(10) Patent No.: US 10,653,168 B2
(45) Date of Patent: May 19, 2020

(54) ORAL REHYDRATION SOLUTION WITH IMPROVED TASTE

(71) Applicant: Sweetwater Solutions, LLC, Culver, OR (US)

(72) Inventors: Dwayne Thomas Friesen, Bend, OR (US); Rodney James Ketner, Bend, OR (US); Michael Edward Grass, Bend, OR (US)

(73) Assignee: Sweetwater Solutions, LLC, Seattle, WA (US)

( * ) Notice: Subject to any disclaimer, the term of this patent is extended or adjusted under 35 U.S.C. 154(b) by 356 days.

(21) Appl. No.: 14/043,665

(22) Filed: Oct. 1, 2013

(65) Prior Publication Data

US 2014/0370145 A1 Dec. 18, 2014

Related U.S. Application Data

(63) Continuation-in-part of application No. 13/916,381, filed on Jun. 12, 2013, now abandoned.

(51) Int. Cl.
*A23L 2/38* (2006.01)
*A23L 33/16* (2016.01)

(52) U.S. Cl.
CPC ............... *A23L 2/38* (2013.01); *A23L 33/16* (2016.08); *A23V 2002/00* (2013.01)

(58) Field of Classification Search
CPC ............ A23L 33/16; A23V 2002/00; A23V 2200/244; A23V 2200/33; A23V 2250/032; A23V 2250/16; A23V 2250/1614; A23V 2250/5026; A23V 2250/61
See application file for complete search history.

(56) References Cited

U.S. PATENT DOCUMENTS

| | | | |
|---|---|---|---|
| 2,714,083 A | * | 7/1955 | Ferguson, Jr. ......... A61K 31/70 514/57 |
| 4,021,543 A | | 5/1977 | Mckay |
| 4,871,550 A | | 10/1989 | Millman |
| 5,032,411 A | | 7/1991 | Stray-gundersen |
| 5,447,730 A | | 9/1995 | Greenleaf |
| 5,480,674 A | | 1/1996 | Peterson |
| 5,891,888 A | | 4/1999 | Strahl |
| 6,033,713 A | | 3/2000 | Sheldon |
| 6,051,236 A | | 4/2000 | Portman |
| 6,329,414 B1 | | 12/2001 | Thomas et al. |

(Continued)

FOREIGN PATENT DOCUMENTS

| | | |
|---|---|---|
| EP | 0040654 | 4/1984 |
| WO | 2006016349 A1 | 2/2006 |
| WO | 2013006163 A1 | 1/2013 |

OTHER PUBLICATIONS

US 5,643,882 A, 07/1997, Waite (withdrawn)

(Continued)

*Primary Examiner* — Subbalakshmi Prakash
(74) *Attorney, Agent, or Firm* — Lee & Hayes, P.C.

(57) ABSTRACT

Oral rehydration solutions (ORSs), methods of preparing ORSs and methods of delivering rehydration therapy are disclosed herein. In some embodiments, an ORS includes a non-starch viscosity enhancing polymer and a sodium salt. The ORS may include at least approximately 50 millimoles of dissolved sodium per liter. Other embodiments may be described and/or claimed.

10 Claims, 3 Drawing Sheets

(56) References Cited

U.S. PATENT DOCUMENTS

| | | | |
|---|---|---|---|
| 6,572,898 B2* | 6/2003 | Nelson et al. | 424/663 |
| 6,906,038 B2 | 6/2005 | Mazer | |
| 7,026,298 B2 | 4/2006 | Phillips et al. | |
| 7,375,089 B2 | 5/2008 | Verlaan et al. | |
| 7,566,463 B2 | 7/2009 | Ayala | |
| 2002/0009502 A1* | 1/2002 | Nelson et al. | 424/663 |
| 2003/0099722 A1* | 5/2003 | Baxter | 424/679 |
| 2003/0194448 A1 | 10/2003 | Mitchell et al. | |
| 2004/0081708 A1 | 4/2004 | Baxter | |
| 2007/0003670 A1 | 1/2007 | Jendrysik et al. | |
| 2007/0259054 A1* | 11/2007 | Ayala | 424/679 |
| 2008/0214681 A1* | 9/2008 | Sahin | A61K 9/0056 514/789 |
| 2009/0017167 A1* | 1/2009 | Krumhar | A23L 2/52 426/72 |
| 2009/0148566 A1 | 6/2009 | Murray et al. | |
| 2010/0129497 A1 | 5/2010 | Rinaldi et al. | |
| 2011/0142962 A1 | 6/2011 | Luebbers et al. | |
| 2011/0300266 A1 | 12/2011 | Rinaldi et al. | |

OTHER PUBLICATIONS

Go, J.T. Sia, C.G. Harper, R.G. Wapnir, R.A. Oral rehydration solutions (ORS): enhancement by a soluble fiber. Journal of the American College of Nutrition (USA). Aug. 1994. v. 13(4) (abstract).*

Rose Marie Pangborn et al. Effect of Hydrocolloids on Oral Viscosity and Basic Taste Intensities Journal of Texture Studies vol. 4, Issue 2, (/doi/10.1111/jts.1973.4.issue-2/issuetoc) abstract Jun. 1973(http://www.altmetric.com/details.php?domain=onlinelibrary.wiley.com&doi=10.1111/j.1 745 accessed Oct. 6, 2014.*

World Health Organization et al., "Oral Rehydration Salts: Production of the new ORS," 2006, 123 pages.

Hahn, S. et al., "Reduced osmolarity oral rehydration solution for treating dehydration due to diarrhoea in children: systematic review," BMJ, Jul. 14, 2001, pp. 81-85, vol. 325.

Wright, E. M. et al., "Coupling between Na+, Sugar, and Water Transport across the Intestine," Annals of the New York Academy of Sciences, Dec. 2000, pp. 54-66, vol. 915.

Shirreffs, S., "The optimal sports drink," Schweizerishe Zeitschrift fur Sportmedizin and Sporttraumatolgie, 2003, pp. 25-29, vol. 51.

Snyder, J. D., "From pedialyte to popsicles: a look at oral rehydration therapy used in the United States and Canada," Am. J. Clin. Nutrition, Jan. 1982, pp. 157-161, vol. 35.

McCaughey, S. A. et al., "The Taste of Sodium," Neurosci. Biobehav. Rev., Sep. 1998, pp. 663-676, vol. 22, No. 5.

Freedman, S. B. et al., "Assessing the Palatability of Oral Rehydration Solutions in School-aged Children," Arch. Pediatr. Adolesc. Med., Aug. 2010, pp. 696-702, vol. 164, No. 8.

Coso, J. D. et al., "Anaerobic Performance When Rehydrating With Water or Commercially Available Sports Drinks During Prolonged Exercise in the Heat," Appl. Physiol. Nutr. Metab., 2008, pp. 290-298, vol. 33.

KIMICA Corporation, "Alginate: How to Use," 2010, 2 pages, http://kimica-alginate.com/alginate/how_to_use.

International Search Report and Written Opinion in PCT/US2013/062912, dated Feb. 19, 2014, 11 pages.

* cited by examiner

ORAL REHYDRATION SOLUTION WITH IMPROVED TASTE

CROSS REFERENCE TO RELATED APPLICATIONS

The present application is a continuation-in-part of and claims priority to U.S. patent application Ser. No. 13/916,381, filed Jun. 12, 2013, entitled "Oral Rehydration Solution with Improved Taste," the entire disclosure of which is hereby incorporated by reference in its entirety.

BACKGROUND

Dehydration from acute diarrhea is one of the leading causes of mortality among infants and young children in developing countries. In the United States, dehydration from diarrhea and vomiting can lead to costly emergency room visits. However, dehydration from diarrhea can be cheaply and successfully managed at home by administering an oral rehydration solution (ORS), typically a glucose-electrolyte solution. This method of treatment is termed oral rehydration therapy (ORT). The World Health Organization (WHO) has suggested the use of an ORS with the composition shown in Table 1. This solution has been shown to treat dehydration from acute diarrhea in several clinical studies and is believed to be a more effective treatment than the previously recommended composition, which contained more salt and sugar.

TABLE 1

ORS composition recommended by the WHO.

| component | millimoles/liter |
|---|---|
| Sodium | 75 |
| Chloride | 65 |
| Glucose, anhydrous | 75 |
| Potassium | 20 |
| Citrate | 10 |

ORT is often carried out with fluids that do not meet the WHO's recommended composition, despite the data. These alternative beverages, such as sports drinks, other electrolyte solutions, and fruit juice, are typically not formulated for the unique needs of dehydrated patients, and thus may fail to provide effective ORT. Sports drinks, for example, are typically formulated to replace sugar and sodium lost as a result of exercise and sweat, rather than being optimized for dehydration from vomiting. In particular, many sports drinks contain fructose and/or sucrose (which hydrolyzes into fructose and glucose), in addition to glucose, in order to maximize sugar uptake because the absorption of glucose and fructose are independent of each other. Sports drinks are also aimed at replacing electrolytes lost through sweating, which is almost exclusively sodium. Vomiting and diarrhea, however, lead to substantial loss of potassium in addition to sodium and therefore treatment must replace lost potassium. Some oral electrolyte solutions, though marketed for ORT in response to dehydration in children, do not meet the WHO's recommended composition. For example, PEDIALYTE, manufactured by Abbott Laboratories of Chicago, Ill., has a glucose/sodium ratio of 7.4 (instead of the approximately one-to-one ratio of the WHO's recommended composition).

Although these alternative beverages do not provide the therapeutic effects of the WHO's recommended composition, some may be used more often by clinicians and/or patients than the WHO composition because of a taste preference for sweeter, less salty drinks, the convenience and availability of some alternative beverages, and/or the low cost of some alternative beverages. In particular, one of the main difficulties in administering ORSs, particularly in pediatric settings, is that existing ORSs taste very salty. To get children to drink an effective amount of an ORS, the ORS is formulated with extra sugar and other additives to mask the taste of the salt or to lower the electrolyte concentration. However, adding sugar or decreasing the electrolyte concentration may result in less effective rehydration.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the accompanying drawings.

DETAILED DESCRIPTION OF THE DRAWINGS

In the following detailed description, reference is made to the accompanying drawings which form a part hereof, and in which are shown by way of illustration embodiments that may be practiced. It is to be understood that other aspects and/or embodiments may be utilized and structural or logical changes may be made without departing from the scope. Therefore, the following detailed description is not to be taken in a limiting sense. For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C).

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.). With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Disclosed herein are oral rehydration solutions (ORSs), methods of preparing ORSs and methods of administering rehydration treatment using ORSs. In some embodiments, an ORS may include a non-starch viscosity enhancing polymer and a sodium salt such that the ORS includes at least approximately 50 millimoles of dissolved sodium per liter. Various embodiments of the ORSs disclosed herein may provide one or more advantages in the treatment of dehydration as compared to existing beverages, such as improved taste, easier manufacturability, reduced cost, better therapeutic effect, and/or lower calories, among others.

Figure 1:
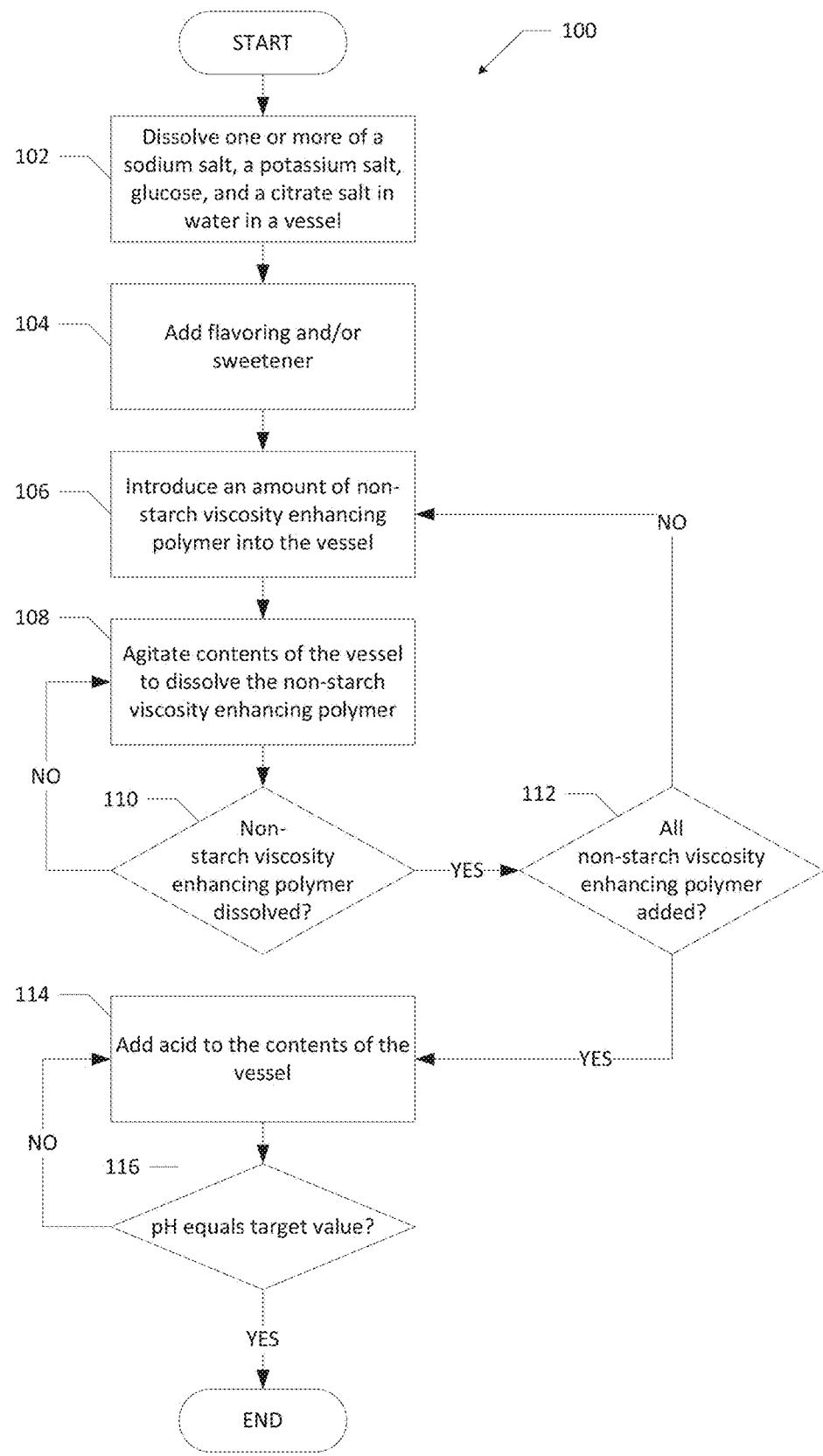
FIG. 1 is a flow diagram of a method of preparing an ORS, in accordance with various embodiments.

FIG. 1 is a flow diagram of a method 100 of preparing various embodiments of the ORSs disclosed herein. Various operations of the method 100, and of other methods disclosed herein, may be described as multiple discrete operations in turn, in a manner that may be helpful in understanding the disclosure; however, the order of description should not be construed to imply that these operations are order dependent. In various embodiments, operations of the method 100 (and any other method disclosed herein) may be eliminated, duplicated, re-ordered, or substituted as appropriate.

At the operation 102, one or more of a sodium salt, a potassium salt, glucose, and a citrate salt may be dissolved in water in a vessel. These constituents may be introduced to the vessel in any suitable order, and various combinations of the constituents may be pre-combined and/or dissolved before the operation 100. In some embodiments, the vessel and/or its contents may be agitated to speed dissolution (e.g., by stirring or shaking).

The sodium salt of the operation 102 may provide sodium to the patient to replace sodium lost during vomiting and/or diarrhea. In some embodiments, the sodium salt may include sodium chloride. In some embodiments, the sodium salt may include one or more of sodium chloride, sodium lactate, trisodium citrate, sodium gluconate, monosodium phosphate, disodium phosphate, trisodium phosphate, tetrasodium acid pyrophosphate, sodium acid sulfate, sodium carbonate, and sodium bicarbonate, for example. The amount of sodium salt dissolved at operation 102 may be selected to provide between approximately 50 and approximately 90 millimoles of dissolved sodium per liter of the ORS. In some embodiments, the amount of sodium salt dissolved at operation 102 may be selected to provide approximately 70-75 millimoles of dissolved sodium per liter of the ORS.

The potassium salt of the operation 102 may provide potassium to the patient to replace potassium lost during vomiting and/or diarrhea. In some embodiments, the potassium salt may include potassium chloride. In some embodiments, the potassium salt may include one or more of potassium chloride, potassium citrate, potassium gluconate, monopotassium phosphate, dipotassium phosphate, tripotassium phosphate, tetrapotassium pyrophosphate, potassium sulfate, potassium acetate, potassium bicarbonate, and potassium bromide, for example. The amount of potassium salt dissolved at operation 102 may be selected to provide between approximately 15 and approximately 25 millimoles of dissolved potassium per liter of the ORS. In some embodiments, the amount of potassium salt added at operation 102 may be selected to provide approximately 20 millimoles of dissolved potassium per liter of the ORS.

In some embodiments, the amount of glucose dissolved at operation 102 may be selected to provide less than approximately 115 millimoles of dissolved glucose per liter of the ORS. In some embodiments, the amount of glucose dissolved at operation 102 may be selected based on the amount of sodium salt dissolved at operation 102. For example, in some embodiments, the amount of glucose dissolved at operation 102 may be selected so that the concentration of dissolved glucose in the ORS is approximately equal to or greater than the concentration of dissolved sodium in the ORS. In some embodiments, the glucose of the operation 102 may be included in an approximately one-to-one molar ratio with the sodium contributed by the sodium salt. According to the WHO, this ratio may provide optimal absorption of both sodium and water. In some embodiments, glucose may be the only sugar included in the ORS. In particular, in some embodiments, the ORS may not include sucrose or fructose. In other embodiments, one or more additional sugars (such as sucrose or fructose) may be included in the ORS.

The citrate salt of the operation 102 may help correct the acidification of the blood and tissue fluids of a dehydrated patient (referred to as "acidosis"). In some embodiments, the citrate salt of the operation 102 may include trisodium citrate, dehydrate. In some embodiments, the amount of citrate salt dissolved at operation 102 may be selected to provide between approximately 8 and approximately 12 millimoles of dissolved citrate per liter of the ORS, or between approximately 10 and approximately 12 millimoles of dissolved citrate per liter of the ORS. In some embodiments, the amount of citrate salt dissolved at operation 102 may be selected to provide approximately 10 millimoles of dissolved citrate per liter of the ORS.

At the operation 104, a flavoring and/or a sweetener may be added to the contents of the vessel. In some embodiments, the operations 102 and 104 may be combined into a single operation. In some embodiments, the flavoring may include a citrus (e.g., orange, lemon, or lime) flavoring, another fruit flavoring, a vanilla flavoring, any other flavoring or any combination of flavorings. For example, in some embodiments, a vanilla flavoring may be included in an amount between approximately 0.03 and 0.05% wt. Flavorings may include extracts, juices, essences, or other types of flavorings. As discussed below, because the tongue includes hydrogen ion receptors that affect taste perception, the pH of the final ORS may be adjusted based on the identity of the flavoring added at the operation 104. For example, a lower pH may be preferred when a citrus (or other "sour") flavoring is used. In some embodiments, the pH of the ORS may be adjusted to between approximately 3.5 and approximately 4.5 when a citrus flavoring is used.

Operation 104 may be optional; in some embodiments, no flavoring may be added to the ORS. In some embodiments, a flavoring may be added to the ORS just prior to its use in treating a patient for dehydration (e.g., by adding liquid or powder flavors to an otherwise unflavored ORS). In some embodiments, the amount and identity of sweetener included in the ORS may depend on the amount and identity of the flavoring. For example, less sweetener may be desirable when more flavoring (e.g., lemon or vanilla) is included in the ORS.

In some embodiments, the sweetener of the operation 104 may include a non-sugar sweetener, such as a low-calorie or zero-calorie sweetener. For example, the sweetener may include erythritol and/or rebaudioside A (a stevia leaf extract). An example of a suitable sweetener is marketed by The Truvia Company, LLC, under the brand name TRUVIA. Another example of a suitable sweetener is marketed by Wisdom Natural Brands under the brand name SWEETLEAF. In some embodiments, the sweetener of the operation 104 may provide between approximately 14 and approximately 28 millimoles of erythritol per liter of the ORS. In some embodiments, the sweetener may be a low calorie sweetener that may mask the saltiness of the ORS without substantially increasing the osmolarity of the ORS (which may inhibit the efficacy of the ORS). The use of a non-sugar sweetener may allow the ORS to achieve sufficient sweetness while maintaining a suitable ratio of glucose to sodium and controlling the caloric content of the ORS. In some embodiments, the sweetener of the operation 104 may not be a non-sugar sweetener, and may include one or more sugars.

In some embodiments, the method 100 may include providing sweetener in an amount between approximately 0.4 and approximately 0.8% wt. In some embodiments, the method 100 may include providing between approximately 2 and approximately 10 grams of non-sugar sweetener for dissolving per liter of ORS. In some embodiments, the method 100 may include providing between approximately 2 and approximately 8 grams of non-sugar sweetener for dissolving per liter of ORS, between approximately 2 and approximately 5 grams of non-sugar sweetener for dissolving per liter of ORS, between approximately 2 and approximately 4 grams of non-sugar sweetener for dissolving per liter of ORS, or between approximately 3 and approximately 4 grams of non-sugar sweetener for dissolving per liter of ORS.

At the operation 106, an amount of viscosity enhancing polymer may be introduced to the vessel, and at operation 108, the contents of the vessel may be agitated to dissolve the viscosity enhancing polymer. In some embodiments, the operations 106 and 108 may be performed substantially simultaneously or in overlapping fashion. When a powdered viscosity enhancing polymer is used, too rapid introduction into the vessel may lead to the formation of powder globules that may be difficult to dissolve. As discussed below with reference to FIGS. 5 and 6, the viscosity enhancing polymer may thicken the boundary layer between the consumer's tongue and the ORS when the ORS is being consumed, thereby slowing the diffusion of ions (such as sodium ions) to receptors on the tongue. In some embodiments, the viscosity enhancing polymer may be introduced into the vessel at operation 106 in granule or crystalline powder form. The crystalline powder form of the viscosity enhancing polymer may dissolve less quickly than a granule form. The viscosity enhancing polymer may include a non-starch polymer, such as carboxymethyl cellulose. The viscosity enhancing polymer may include a non-starch, ionic polymer. For example, in some embodiments, the viscosity enhancing polymer may include sodium alginate. In some embodiments, the viscosity enhancing polymer may include polycose.

At the operation 110, the contents of the vessel may be evaluated (or the method 100 may be otherwise assessed) to determine whether the amount of viscosity enhancing polymer introduced at the operation 106 has been dissolved. This determination may be made by a human operator, an automated set of manufacturing equipment, a timer, or by any other suitable technique or combination of techniques. If the amount of viscosity enhancing introduced at the operation 106 is determined to be undissolved (to an appropriate degree), the operation 108 (agitating the contents of the vessel) may be repeated or continued.

If the amount of viscosity enhancing polymer introduced at the operation 106 is determined to be sufficiently dissolved at the operation 110, the method 100 may proceed to the operation 112, at which point the total amount of viscosity enhancing polymer introduced to the vessel has reached a desired amount. This desired amount may be predetermined, or may be determined dynamically based on an evaluation of the properties of the contents of the vessel as the viscosity enhancing polymer is introduced and dissolved. In some embodiments (e.g., embodiments in which the viscosity enhancing polymer is a non-starch viscosity enhancing polymer, such as sodium alginate or carboxymethyl cellulose), the desired amount may be between approximately 0.1 and approximately 0.25 wt %. In some embodiments in which the viscosity enhancing polymer is sodium alginate, the desired amount may be between approximately 0.5 and approximately 3 grams per liter of the ORS, between approximately 1 and approximately 3 grams per liter of the ORS, or between approximately 1 and approximately 2.5 grams per liter of the ORS. In some embodiments in which the viscosity enhancing polymer is polycose, the desired amount may be between approximately 1 and approximately 10 wt %.

If an insufficient amount of viscosity enhancing polymer is determined to have been added at the operation 112, the method 100 may repeat the operation 106 and more viscosity enhancing polymer may be introduced to the contents of the vessel. The operations 106, 108, 110 and 112 may be repeated until the desired amount of viscosity enhancing polymer has been dissolved in the contents of the vessel.

At the operation 114, an acid may be added to the contents of the vessel. As discussed below with reference to FIG. 3, acidifying the ORS may help mask the taste of the sodium in the ORS, thereby making the ORS more palatable to consumers. In some embodiments, the amount of acid added to the contents of the vessel may be between approximately 0.01 and approximately 0.25 wt %. In some embodiments, the acid may include citric acid or hydrochloric acid. In some embodiments in which the acid includes citric acid, the amount of citric acid may be between approximately 0.1 and approximately 0.8 grams per liter of the ORS. In some embodiments in which the acid includes citric acid, the amount of citric acid may be approximately 0.4 grams per liter of the ORS. In some embodiments in which the acid includes HCl, the amount of HCl used will be the amount required to adjust the pH of the ORS to a desired level (e.g., in the range of 3-7, or a particular value in that range depending on the identity of one or more flavorings included in the ORS).

Other acids that may be used include ascorbic acid, lactic acid, and/or L-glutamine. In some embodiments in which the acid includes ascorbic acid, the amount of ascorbic acid may be between approximately 0.1 and approximately 2 grams per liter of the ORS. In some embodiments in which the acid includes lactic acid, the amount of lactic acid may be between approximately 0.1 and approximately 2 grams per liter of the ORS. In some embodiments in which the acid includes L-glutamine, the amount of L-glutamine may be between approximately 0.1 and approximately 2 grams per liter of the ORS. In some embodiments, the acid of operation 114 may include L-arginine and/or malic acid. In some embodiments in which the acid includes L-arginine, the amount of L-arginine may be between approximately 50 and approximately 60 millimoles per liter of the ORS. In some embodiments in which the acid includes malic acid, the amount of malic acid may be between approximately 70 and approximately 80 millimoles per liter of the ORS.

The operation 114 may be performed in conjunction with the operation 116, at which the pH of the contents of the vessel is evaluated and compared to a target value. In some embodiments, the target pH may be between approximately 3 and approximately 7.5, between approximately 3.5 and approximately 5.5, between approximately 4 and approximately 5.5, between approximately 4.5 and approximately 5.5, or between approximately 3.5 and approximately 4.5. In some embodiments, the target pH may be approximately 5.5. A target pH of approximately 5.5 may be particularly desirable for an unflavored ORS (e.g., one that does not include any flavorings, such as citrus or vanilla flavorings). A target pH between approximately 3.5 and approximately 4.5 may be particularly desirable for a citrus-flavored ORS.

If the pH of the contents of the vessel is determined at the operation 116 to not have reached a target value, the operation 114 may be repeated and more acid may be added to the contents of the vessel. If the pH of the contents of the vessel is determined at the operation 116 to have reached the target value, the method 100 may then end. The operation 116 may be optional; in some embodiments, the amount of acid needed to achieve a target pH may be known, and thus the operation 116 may not need to be performed. For example, in some embodiments, the total amount of citric acid added to the contents of the vessel may be approximately 0.4 grams per liter of the ORS. Because the acidification of the ORS may decrease the solubility of the viscosity enhancing polymer, in some embodiments, the acid may be added at operation 114 after the introduction of the viscosity enhancing polymer is complete.

The amounts of the constituents of the operation 102, the viscosity enhancing polymer of the operation 106 and the acid of the operation 114, included in the vessel to form the ORS, may vary. In some embodiments, the amounts of these elements may be selected such that the completed ORS includes between approximately 50 and approximately 90 millimoles of dissolved sodium per liter, such as between approximately 60 and approximately 80 millimoles of dissolved sodium per liter, between approximately 50 and approximately 80 millimoles of dissolved chloride per liter, less than approximately 115 millimoles of dissolved glucose per liter, between approximately 15 and approximately 25 millimoles of dissolved potassium per liter, and between approximately 8 and approximately 12 millimoles of dissolved citrate per liter. In some embodiments, the amounts of these elements may be selected such that the completed ORS includes approximately 75 millimoles of dissolved sodium per liter, approximately 65 millimoles of dissolved chloride per liter, approximately 75 millimoles of dissolved glucose per liter, approximately 20 millimoles of dissolved potassium per liter, and approximately 10 millimoles of dissolved citrate per liter. Such a composition is in accord with the WHO recommended composition discussed above.

Other components may be included in the ORS, and added at or between any of the operations of method 100. For example, other electrolytes, such as zinc-based compounds, may be added at any appropriate stage.

The ORSs disclosed herein may include various combinations of embodiments of the constituents of the operation 102, embodiments of the viscosity enhancing polymer of the operation 106, and embodiments of the acid of the operation 114. For example, in some embodiments, the viscosity enhancing polymer may include a non-starch viscosity enhancing polymer (e.g., a non-starch, ionic viscosity enhancing polymer, such as sodium alginate), and the acid may include citric acid. The composition of one WHO-compliant ORS, prepared in accordance with the method 100 of FIG. 1, is presented below in Table 2.

TABLE 2

Example ORS composition. Listed amounts of dry powder dissolved in 1 liter of water.

| component | grams/liter |
|---|---|
| Sodium chloride | 2.6 |
| Glucose, anhydrous | 13.5 |

TABLE 2-continued

Example ORS composition. Listed amounts of dry powder dissolved in 1 liter of water.

| component | grams/liter |
|---|---|
| Potassium chloride | 1.5 |
| Trisodium citrate, dehydrate | 2.3 |
| Citric acid | 0.38 |
| TRUVIA | 2-4 |
| Sodium alginate | 1.5 |

Figure 2:
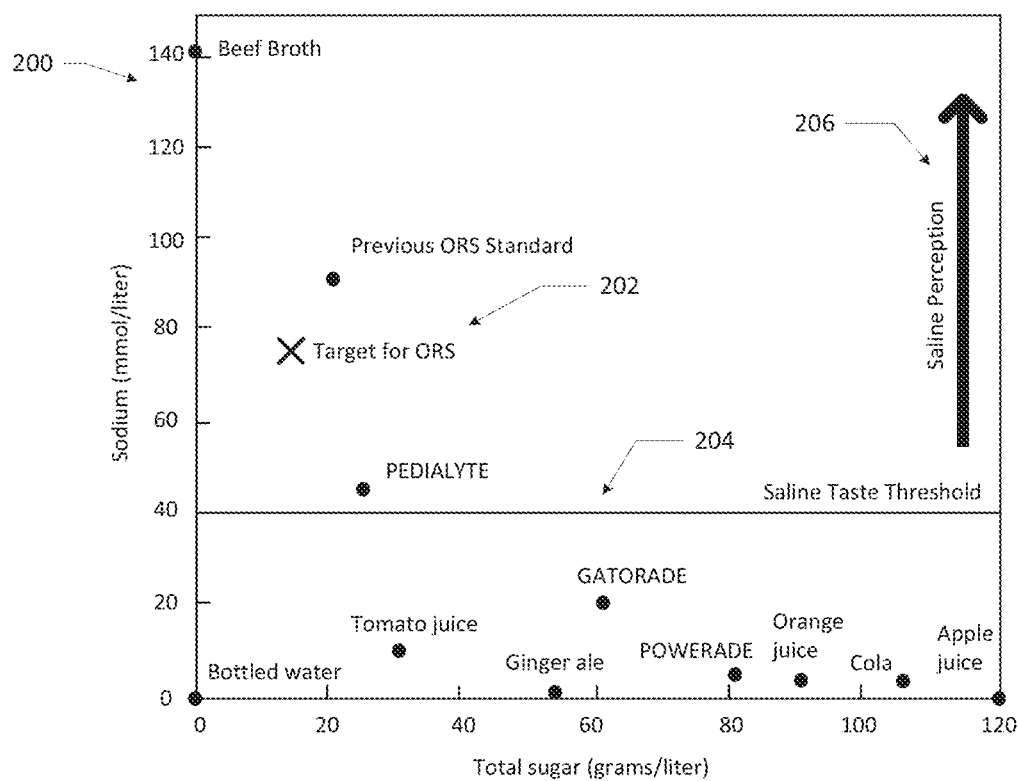
FIG. 2 is a graphical depiction of total sugar and sodium content of various beverages, in accordance with various embodiments.

FIG. 2 is a graphical depiction 200 of total sugar and sodium content of various beverages, in accordance with various embodiments. The WHO recommended composition is indicated as 202, while the compositions of various other beverages, including some sold for sports rehydration and therapeutic rehydration, are also represented. Various embodiments of the ORSs disclosed herein, such as the ORS of Table 2, satisfy the sugar and sodium content criteria of the WHO recommended composition, unlike the other beverages represented in FIG. 2.

Also indicated in FIG. 2 is the saline taste threshold 204, which represents the amount of sodium in a beverage above which consumers report a "salty" taste, as described in S. A. McCaughey and T. R. Scott, "The Taste of Sodium," Neurosci. Biobehav. Rev., 1998, 22, pp. 663-676. As indicated by the arrow 206, the perception of saline increases as the sodium content increases beyond the saline taste threshold 204. As noted above, the salty taste of the WHO recommended composition may be one of the factors contributing to the use of alternative, therapeutically inferior beverages for rehydration therapy. Embodiments of the ORSs described herein may use combinations of various tastemasking techniques to fulfill a need in the medical community by providing a palatable beverage that meets the criteria for the WHO recommended composition. A detailed discussion of a number of tastemasking techniques follows.

Figure 3:
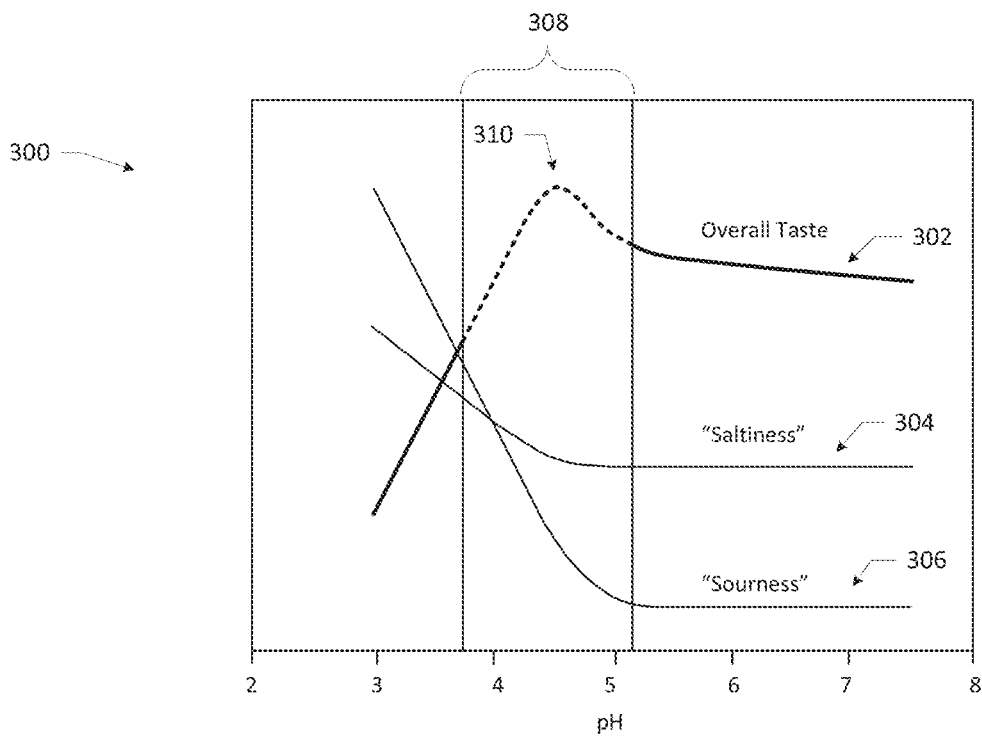
FIG. 3 is a graphical depiction of relationships between overall taste, "saltiness," and "sourness" of an ORS as a function of pH, in accordance with various embodiments.

FIG. 3 is a graphical depiction 300 of relationships between overall taste 302, "saltiness" 304, and "sourness" 306 of an ORS as a function of pH, in accordance with various embodiments. As indicated above, because the tongue includes many hydrogen ion receptors, the concentration and type of acid used in an ORS may alter both the perceived sourness and saltiness of an ORS. Adjusting the pH of an ORS may also change the ionic state of solutes, such as citrate. Acidified citrate, for example, may taste much sourer than more basic solutions.

In particular, FIG. 3 represents a tasting panel's empirical observations of overall taste 302, "saltiness" 304, and "sourness" 306 of a common composition as the amount of acid in the composition was varied to vary the pH. At low pH (e.g., below 3.5), the ORS tasted both salty and very tart. At high pH (e.g., above 7.5), the ORS was reported to have an unpleasant alkaline taste. A peak 310 in the overall taste 200 indicates that, at a pH between 4 and 5, the "sourness" 306 provided by the acid interacts with the "saltiness" 202 (e.g., by masking or distracting) to provide a maximal tastemasking effect. In general, the pH range 308, from approximately 3.5 to approximately 5.5, may be identified as a palatable range. As represented in FIG. 3, the taste response to various ions may not be linear, making it a challenge to formulate palatable solutions.

Figure 4:
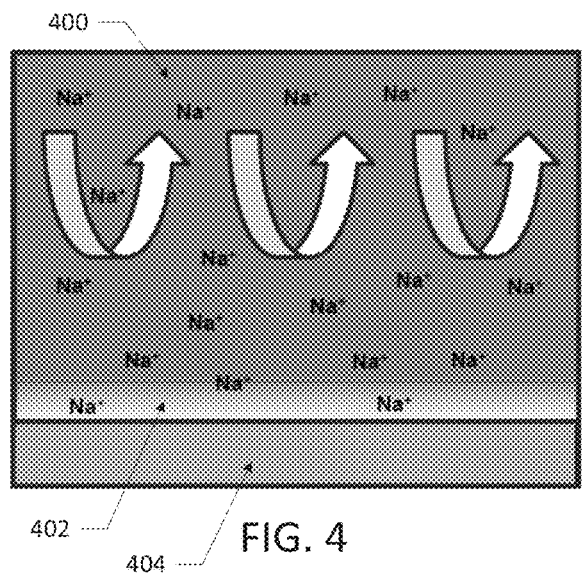
FIGS. 4 and 5 illustrate a boundary layer technique for tastemasking in an ORS using a viscosity enhancer, in accordance with various embodiments.
Figure 5:
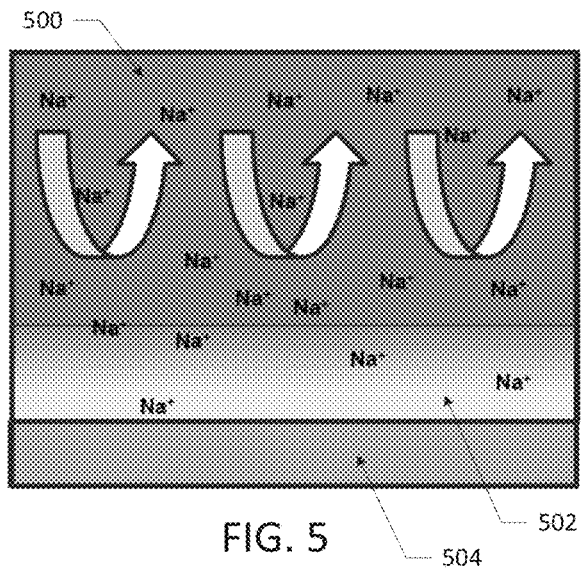

FIGS. 4 and 5 illustrate a boundary layer technique for tastemasking in an ORS using a viscosity enhancer, in accordance with various embodiments. FIG. 4 depicts a sodium solution/saliva mixture 400 (which typically has a viscosity of approximately 1 centipoise and a diffusivity of approximately $10^{-6}$ centimeters/second$^2$) in the mouth of a consumer. Bulk mixing convection takes place in the sodium solution/saliva mixture 400. A thin boundary layer 402 of mucus is interposed between the tongue 404 and the sodium solution/saliva mixture 400, through which sodium ions from the mixture 400 diffuse and are detected by receptors of the tongue 404.

FIG. 5 depicts a sodium solution/saliva mixture 500 in the mouth of a consumer, wherein the mixture 500 includes sodium alginate in the amount of one percent. The inclusion of the sodium alginate increases the viscosity of the mixture 500 (e.g., to approximately 100 centipoise) and aids in forming a thicker boundary layer 502 of mucus on the tongue 504). The increased viscosity of the mixture 500 and/or the thicker boundary layer 502 slows diffusion of sodium ions to receptors on the tongue 504.

As described, the boundary layer technique illustrated by FIGS. 4 and 5 may be achieved by including a viscosity enhancing polymer in the ORS, which may help to coat the tongue, and thereby slow the diffusion of ions (such as sodium ions) to receptors on the tongue. In some embodiments, the viscosity enhancing polymer may comprise a non-starch, ionic viscosity enhancing polymer; for example, sodium alginate as discussed above. In experiments with a tasting panel, sodium alginate and carboxymethyl cellulose were found to significantly aid in masking saltiness.

The inclusion of organic anions (e.g., citric acid and lactic acid) and anionic polymers (e.g., sodium alginate), in various embodiments of an ORS may provide additional taste-masking effects by providing anionic counterions that may associate with sodium and potassium ions in the ORS. In particular, these counterions may bind sodium and potassium ions, lowering the "apparent concentration" in the consumer's mouth. For example, approximately 65% of the sodium from trisodium citrate dissociates to sodium ions, while about 95% of sodium from sodium chloride dissociates. Non-dissociated sodium ions may taste less salty because they are bulkier and therefore have slower diffusion than dissociated sodium ions. Non-dissociated sodium ions may also taste less salty because sodium receptors on the tongue may particularly detect dissociated sodium ions, and sodium ions associated with their counterions may not be able to be readily transported to the sodium receptors on the tongue. Thus, salts that produce fewer dissociated sodium ions may taste less salty.

Figure 6:
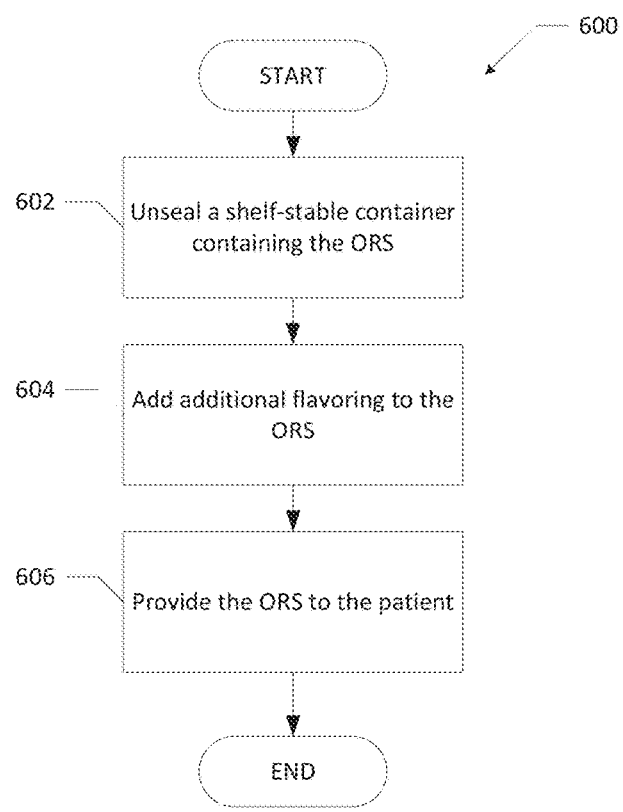
FIG. 6 is a flow diagram of a method of administering rehydration therapy to a patient, in accordance with various embodiments.

FIG. 6 is a flow diagram of a method 600 of administering rehydration therapy to a patient, in accordance with various embodiments. The method 600 may include administering an ORS to the patient, such as any of the ORSs disclosed herein. For example, the ORS may include a non-starch viscosity enhancing polymer, a sodium salt, a potassium salt, glucose, a citrate salt, acid, and sweetener, in amounts such that the ORS includes at least approximately 50 millimoles of dissolved sodium per liter, such as between approximately 50 and approximately 90 millimoles of dissolved sodium per liter, between approximately 50 and approximately 80 millimoles of dissolved chloride per liter, less than approximately 115 millimoles of dissolved glucose per liter, between approximately 15 and approximately 25 millimoles of dissolved potassium per liter, and between approximately 8 and approximately 12 millimoles of dissolved citrate per liter. In some embodiments, the ORS may include a non-starch viscosity enhancing polymer, a sodium salt, a potassium salt, glucose, a citrate salt, acid, and sweetener, in amounts such that the ORS includes approximately 70-75 millimoles of dissolved sodium per liter, approximately 65 millimoles of dissolved chloride per liter, approximately 75 millimoles of dissolved glucose per liter, approximately 20 millimoles of dissolved potassium per liter, and approximately 10 millimoles of dissolved citrate per liter.

At the operation 602, a shelf-stable container (e.g., a plastic bottle sealed with a plastic or foil seal) of the ORS may be unsealed. In some embodiments, one or more of the container and the ORS may be translucent. At the operation 604, additional flavoring may be added to the ORS (for example, in response to a patient preference). The operation 604 may be optional; in some embodiments, the ORS may be pre-flavored (e.g., with a citrus or vanilla flavoring) or may be administered unflavored. At the operation 606, the ORS may be administered to the patient for oral consumption.

Various embodiments of the ORSs disclosed herein may be formulated from ingredients that are natural, generally regarded as safe ("GRAS"), common in the food industry, relatively inexpensive, and/or have precedence for being manufactured at a commercial scale. Additionally, ORSs meeting the WHO's recommended composition, as disclosed herein, may be adjusted in one or more of their components for different hydration applications. In some embodiments, one or more components of WHO-compliant ORSs may be adjusted to provide sports drinks, electrolyte maintenance drinks, and/or energy drinks. For example, providing a larger fraction of sodium from salts such as sodium citrate, sodium lactate, and other organic sodium salts may taste less salty than the WHO-compliant ORSs, and may therefore be suitable for one or more of these other applications.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein.

What is claimed is:

1. An oral rehydration solution (ORS) for human consumption, comprising:
    a potassium salt such that the ORS comprises between approximately 10 and approximately 25 millimoles of dissolved potassium per liter;
    a citrate salt such that the ORS comprises between approximately 4 and approximately 6 millimoles of dissolved citrate salt per liter;
    hydrochloric acid, ascorbic acid, lactic acid, or L-glutamine for pH adjustment to aid in the interference between sodium ion receptors on a human tongue and sodium content at or exceeding 40 mmol/L;
    a non-starch viscosity enhancing sodium salt polymer including sodium carboxymethyl cellulose; and
    a second sodium salt different from the non-starch viscosity enhancing sodium salt polymer;
    wherein:
        the ORS comprises between approximately 0.1 and approximately 0.25 wt % sodium carboxymethyl cellulose;
        the ORS comprises at least approximately 50 millimoles of dissolved sodium per liter;

the ORS includes glucose in an amount such that a molar ratio of glucose to sodium is approximately one-to-one;

the ORS includes citric acid in an amount between approximately 1.3 grams per liter and approximately 1.8 grams per liter;

the ORS includes erythritol in an amount of between approximately 14 and 28 millimoles per liter;

the ORS has a pH greater than approximately 3.8 and less than approximately 4.5; and the sodium carboxymethyl cellulose is present in an amount that when mixed with saliva from the human forms a mucus layer barrier which prevents the interaction of sodium ions in the ORS with the taste buds on the human tongue.

2. The ORS of claim 1, wherein the ORS comprises at least 100 millimoles of dissolved sodium per liter.

3. The ORS of claim 1, further comprising flavoring.

4. The ORS of claim 1, wherein sucrose and fructose are absent from the ORS.

5. A method of preparing an oral rehydration solution (ORS), comprising:

in a vessel, dissolving a sodium salt, a potassium salt such that the ORS comprises between approximately 10 and approximately 25 millimoles of dissolved potassium per liter, glucose, and a citrate salt such that the ORS comprises between approximately 4 and approximately 6 millimoles of dissolved citrate salt per liter in water;

after the dissolving, introducing:

a non-starch viscosity enhancing polymer including sodium carboxymethyl cellulose into the vessel while agitating contents of the vessel to dissolve the non-starch viscosity enhancing polymer, the ORS comprising between approximately 0.1 and approximately 0.25 wt % sodium carboxymethyl cellulose;

citric acid in an amount between approximately 1.3 grams per liter and approximately 1.8 grams per liter; and erythritol in an amount of between approximately 14 and 28 millimoles per liter; and after the introducing, adding an acid to the contents of the vessel until a target pH is reached, the acid including hydrochloric acid, ascorbic acid, lactic acid, or L-glutamine for pH adjustment to aid in the interference between sodium ion receptors on a human tongue and sodium content at or above 40 mmol/L, the target pH being greater than approximately 3.8 and less than approximately 4.5, and the contents of the vessel comprise at least approximately 50 millimoles of dissolved sodium per liter, wherein the contents of the vessel further comprise an amount of glucose such that a molar ratio of glucose to sodium is approximately one-to-one.

6. The method of claim 5, wherein the non-starch viscosity enhancing sodium salt polymer is introduced into the vessel in granule or crystalline powder form.

7. The method of claim 5, further comprising adding a citrus or vanilla flavoring to the contents of the vessel.

8. A method of administering rehydration therapy to a human patient, comprising:

providing an oral rehydration solution (ORS) to the patient, the ORS comprising:

a potassium salt such that the ORS comprises between approximately 10 and approximately 25 millimoles of dissolved potassium per liter;

a citrate salt such that the ORS comprises between approximately 4 and approximately 6 millimoles of dissolved citrate salt per liter;

hydrochloric acid, ascorbic acid, lactic acid, or L-glutamine for pH adjustment to aid in the interference between sodium ion receptors on a human tongue and sodium content at or above 40 mmol/L;

a non-starch viscosity enhancing sodium salt polymer including sodium carboxymethyl cellulose; and a second sodium salt different from the non-starch viscosity enhancing sodium salt polymer;

wherein:

the ORS comprises between approximately 0.1 and approximately 0.25 wt % sodium carboxymethyl cellulose;

the ORS comprises at least approximately 50 millimoles of dissolved sodium per liter;

the ORS includes glucose in an amount such that a molar ratio of glucose to sodium is approximately one-to-one;

the ORS includes citric acid in an amount between approximately 1.3 grams per liter and approximately 1.8 grams per liter;

the ORS includes erythritol in an amount of between approximately 14 and 28 millimoles per liter;

the ORS has a pH greater than approximately 3.8 and less than approximately 4.5; and the sodium carboxymethyl cellulose is present in an amount that when mixed with saliva from the human forms a mucus layer barrier which prevents the interaction of sodium ions in the ORS with the taste buds on the human tongue.

9. The ORS of claim 1, wherein the citrate salt comprises sodium citrate.

10. The method of claim 5, wherein the citrate salt comprises sodium citrate.

* * * * *

UNITED STATES PATENT AND TRADEMARK OFFICE
CERTIFICATE OF CORRECTION

PATENT NO. : 10,653,168 B2
APPLICATION NO. : 14/043665
DATED : May 19, 2020
INVENTOR(S) : Dwayne Thomas Friesen et al.

Page 1 of 1

It is certified that error appears in the above-identified patent and that said Letters Patent is hereby corrected as shown below:

On the Title Page

Item (73), change "Seattle, WA" to --Culver, OR--.

Signed and Sealed this
Twentieth Day of October, 2020

Andrei Iancu
*Director of the United States Patent and Trademark Office*